UNITED STATES PATENT OFFICE.

JULIUS BAUR, OF BROOKLYN, NEW YORK.

IMPROVED COMPOSITION FOR LINING OIL-BARRELS.

Specification forming part of Letters Patent No. 48,041, dated June 6, 1865.

*To all whom it may concern:*

Be it known that I, JULIUS BAUR, of Brooklyn, in the county of Kings and State of New York, have invented a new and Improved Lining for Barrels, &c.; and I do hereby declare that the following is a full, clear, and exact description thereof, which will enable those skilled in the art to fully understand and use the same.

This invention consists in a composition of glue with chloride of zinc, with or without glycerine, applied to the inside of a barrel or other package in such a manner that by the action of said composition the pores of the wood are hermetically closed, and leakage of the package is effectually prevented.

In making my composition I take a saturated solution of chloride of zinc and mix it with glue that has been placed in water until it has absorbed as much as it can. This swelled glue is in a condition to dissolve in chloride of zinc, and a compound is obtained which is capable to produce a hermetic lining for petroleum packages. The proportion in which I mix these ingredients together is about as follows: Muriatic acid, one hundred and twenty pounds; metallic zinc, twenty-seven pounds; glue, fifteen pounds, soaked in sixty pounds water, and, if desired, glycerine, ten to fifteen pounds. The chloride of zinc attracts a sufficient quantity of moisture from the atmosphere to keep the staves or wooden sides and ends of the package saturated, and prevents them from drying up, and at the same time, while the pores of the wood are filled with moisture, they do not allow the oil to pass through.

For the glue glycerine can be substituted in the above-named proportion, or, still better, glue and glycerine can be mixed with chloride of zinc, in order to produce the desired result. By these means a lining for petroleum packages can be obtained which is cheap and durable. It is not liable to crack or to scale off, since in applying it the wood in impregnated with the hydrated solution thereof, causing it to absorb as large a quantity as it will take up. The packages are rendered hermetic, and if the composition is applied to barrels it does not interfere with the operation of tightening the hoops.

The barrels or packages can be exposed to the changes of the atmosphere, to the hot sun or cold without danger of rendering the same leaky, and the great loss by leakage in petroleum packages as now used is obviated.

I claim as new and desire to secure by Letters Patent—

1. The employment or use, in a compound for lining petroleum packages, of chloride of zinc and glue, made substantially as herein set forth.

2. The use, in a compound for lining petroleum packages, of chloride of zinc mixed with glycerine, as described.

3. A compound made of chloride of zinc, glue, and glycerine mixed together, substantially in the manner and about in the proportion herein specified.

JULIUS BAUR.

Witnesses:
 J. P. HALL,
 WM. P. MCNAMARA.